R. RICHARDI.

Process for Making Wooden-Scoops.

No. 7,940. Reissued Nov. 6, 1877.

ATTEST.

Fred K. Lear

Paul Bakewell

INVENTOR.

Robert Richardi by Chas. D. Moody.

atty.

N. PETERS, PHOTO-LITHOGRAPHER, WASHINGTON, D. C.

UNITED STATES PATENT OFFICE.

ROBERT RICHARDI, OF BELLEVILLE, ILLINOIS.

IMPROVEMENT IN PROCESSES FOR MAKING WOODEN SCOOPS.

Specification forming part of Letters Patent No. 185,261, dated December 12, 1876; Reissue No. 7,940, dated November 6, 1877; application filed September 28, 1877.

*To all whom it may concern:*

Be it known that I, ROBERT RICHARDI, of Belleville, Illinois, have invented a new and useful Improvement in Wooden Scoops, of which the following is a full, clear, and exact description, reference being had to the annexed drawing, making part of this specification, in which—

Figure 1:
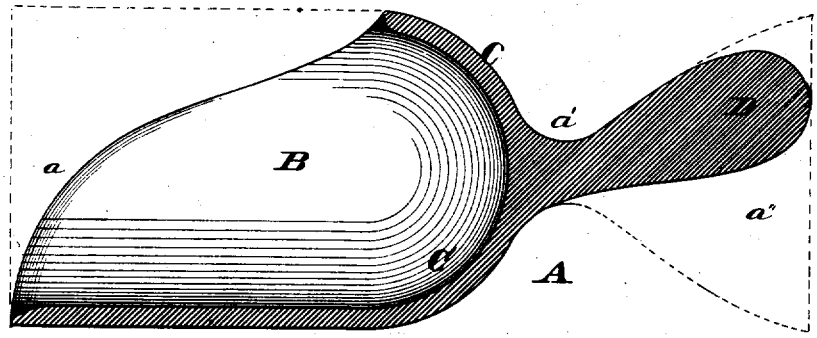
Figure 2:
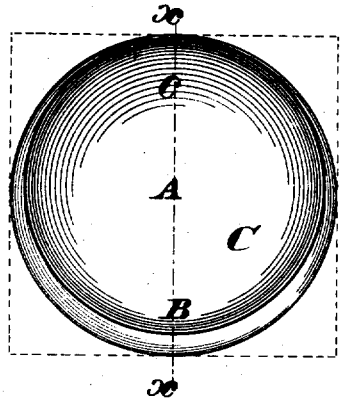

Figure 1 is a vertical longitudinal section taken on the line *x x* of Fig. 2, and Fig. 2 a front view, of my improved scoop.

Similar letters indicate similar parts.

By means of the present invention an improved scoop can be readily and strongly made from a single piece of wood.

The proceeding, generally described, is as follows: A suitable piece of wood is turned into a preliminary shape resembling a goblet, and the part corresponding to the bowl of the goblet is hollowed out; the handle of the scoop is then formed (and at the proper inclination) from that part corresponding to the base of the goblet; and, finally, the scoop is completed by cutting the bowl obliquely, and sharpening its front edge.

Referring to the drawings, A represents my improved scoop. It is made from one piece of wood, and preferably in the following manner: A square block, as indicated by the dotted lines in Fig. 2, and in length and size about that of the intended scoop, is placed in a lathe and turned into a form indicated by the dotted lines in Fig. 1, there being an upper cylindrical part, *a*, a narrow intermediate part, *a'*, and a lower part or base, *a''*. The cylindrical part *a* (and from the top) is then turned or bored out hollow, to form the cavity for the bowl B and head C. The piece or block is then reset in the lathe, so as to bring the longitudinal axis of the intended handle in line with the lathe-centers, and then the handle D, which is inclined to the bowl, as shown in Fig. 1, is formed out of the base *a''*. The cylindrical part is then cut away, so as to form a bowl, B, having an open top, and sides curved or inclined, as shown in Fig. 1. The edges at the front or nose of the scoop are beveled and sharpened, to enable the scoop to readily penetrate the material to be gathered up.

The above-described scoop is economically made, as nearly all the work is done in a lathe. It is also very strong and durable, by reason of its cylindrical outline, and because the grain of the wood is parallel, or nearly so, with the longitudinal axis of the bowl of the scoop. By reason of this last-named feature I am also enabled to make the bowl very thin.

It will be observed, in forming the handle, it is necessary for the point of the scoop to be almost in a direct line between the two lathe-centers. Hence, to hold the piece properly, I preferably employ a driving-center that is extended from the driving-head into and to, or thereabout, the inner end of the cavity of the piece, and to a point therein that is in line with the longitudinal axis of the intended handle. Near the driving-head the center is bent, to make the requisite offset for entering the cavity, and the end of the center is in line with the center of the mandrel. This enables the block or piece to be so held that the handle can be readily turned.

What I claim is—

1. The process of making grocers' scoops of a single piece of wood, substantially as herein described, and for the purpose specified.

2. As a new manufacture, a scoop formed from a single piece of wood, and having a curved bowl, B, a closed head, C, and inclined handle D, substantially as described.

3. A wooden scoop, A, having a curved bowl, B, and closed head C, substantially as described.

4. In the herein-described process of making a wooden scoop formed from one piece of wood, and having a handle inclined to the bowl of the scoop, turning the bowl of the scoop, and then resetting the piece, so that the intended handle is in line with the lathe-centers, and then turning the handle.

ROBERT RICHARDI.

Witnesses:

CHAS. D. MOODY,

PAUL BAKEWELL.